(12) United States Patent
Lai et al.

(10) Patent No.: US 11,513,949 B2
(45) Date of Patent: Nov. 29, 2022

(54) STORAGE DEVICE, AND CONTROL METHOD AND RECORDING MEDIUM THEREOF

(71) Applicant: SK hynix Inc., Gyeonggi-do (KR)

(72) Inventors: Ching-Chung Lai, Hsinchu County (TW); Lian-Chun Lee, Hsinchu County (TW); Chun-Shu Chen, Hsinchu County (TW)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/210,847

(22) Filed: Mar. 24, 2021

(65) Prior Publication Data
US 2022/0100650 A1 Mar. 31, 2022

(30) Foreign Application Priority Data
Sep. 28, 2020 (TW) .................................. 109133593

(51) Int. Cl.
| | | |
|---|---|---|
| *G06F 12/02* | (2006.01) | |
| *G06F 12/10* | (2016.01) | |
| *G06F 12/08* | (2016.01) | |
| *G06F 12/1009* | (2016.01) | |
| *G06F 12/0891* | (2016.01) | |

(52) U.S. Cl.
CPC ...... *G06F 12/0246* (2013.01); *G06F 12/0253* (2013.01); *G06F 12/0891* (2013.01); *G06F 12/1009* (2013.01); *G06F 2212/7201* (2013.01)

(58) Field of Classification Search
CPC ............ G06F 12/0246; G06F 12/0253; G06F 12/0891; G06F 12/1009; G06F 2212/7201
See application file for complete search history.

(56) References Cited

U.S. PATENT DOCUMENTS

| | | | |
|---|---|---|---|
| 2012/0096217 A1* | 4/2012 | Son ..................... | G06F 12/0246 711/E12.008 |
| 2017/0132074 A1* | 5/2017 | Zhang ................. | G06F 11/1068 |
| 2017/0255550 A1* | 9/2017 | Kim ...................... | G06F 3/0608 |
| 2017/0286286 A1 | 10/2017 | Szubbocsev | |
| 2017/0286288 A1* | 10/2017 | Higgins .............. | G06F 12/0246 |
| 2018/0004653 A1* | 1/2018 | Moon ................. | G06F 12/0253 |

\* cited by examiner

*Primary Examiner* — Masud K Khan
(74) *Attorney, Agent, or Firm* — IP & T Group LLP

(57) ABSTRACT

The memory system comprises nonvolatile memory devices each including plural superblocks and a controller. The controller is configured to select a victim superblock including a smaller number of valid pages than any among remaining superblocks, exchange a greater-valid-pages block with a smaller-valid-pages block, and control the memory device to perform a garbage collection operation on the victim superblock, wherein the greater-valid-pages block is included in the victim superblock and the smaller-valid-pages block is included in one among the remaining superblocks, and wherein the smaller-valid-pages block has a smaller number of valid pages than the greater-valid-pages block.

9 Claims, 11 Drawing Sheets

FIG.8B

SBX →

| 3 | 0 | 0 | 3 |
|---|---|---|---|
| 0 | 0 | 2 | 4 |
| 0 | 1 | 0 | 0 |
| 0 | 2 | 0 | 0 |

SBY ↙

| 8  | 6  | 0  | 15 |
|----|----|----|----|
| 11 | 10 | 12 | 7  |
| 16 | 4  | 12 | 13 |
| 13 | 13 | 13 | 9  |

SBZ ↓

| 13 | 15 | 16 | 15 |
|----|----|----|----|
| 15 | 10 | 12 | 5  |
| 16 | 14 | 14 | 14 |
| 13 | 12 | 13 | 11 |

FIG.9A

STORAGE DEVICE, AND CONTROL METHOD AND RECORDING MEDIUM THEREOF

CROSS-REFERENCES TO RELATED APPLICATION

The present application claims priority under 35 U.S.C. § 119(a) to Taiwan application number 109133593, filed on Sep. 28, 2020, in the Taiwan Intellectual Property Office, which is incorporated herein by reference in its entirety.

BACKGROUND

1. Technical Field

Various embodiments generally relate to an electronic device, and more particularly, to a storage device, and a control method and recording medium thereof.

2. Related Art

Since data stored in a nonvolatile storage device are not lost even after power is cut off and have a small volume and low power consumption, a large number of nonvolatile storage devices, for example, storage devices based on a flash memory, are applied to an electronic device. Furthermore, a nonvolatile storage device such as an SSD (Solid State Drive) has already become a storage device installed in a computer system such as a desktop computer, notebook computer or server.

When executing an application program to store texts, data and photographs or to replay various data such as audio and video data, an electronic device often needs to request a storage device to perform a large quantity of data write operations within a short time. The storage device includes a controller configured to generate a write command and execute the generated write command, according to a write request of the electronic device, i.e., a host. The controller of the storage device may store write commands of the host, using a command queue, and the write commands of the host, stored in the command queue, are sequentially outputted to a memory of the storage device to perform data write operations. On the other hand, the storage device is also requested to perform internal data migration. Thus, when the storage device performs the internal data migration, the internal data migration may have an influence on the execution efficiency of the write commands from the electronic device, thereby reducing and destabilizing the write efficiency of the electronic device. In this case, the reduction and destabilization in the write efficiency have an influence on a smooth reaction of an application program or the efficiency of a service provided by the application program.

In the case of a storage device such as a flash memory or SSD, undesired phenomena may occur during WA (Write Amplification). As one of the undesired phenomena, the amount of actually recorded physical data may become several times larger than the amount of write data. In the flash memory and the SSD, data are recorded in the flash memory in units of pages each constituted by a plurality of memory units (cells). However, data can be erased only in relatively large units of blocks each constituted by a plurality of pages. When data which are not necessary any more are present in some pages of one block, such pages are referred to as invalid pages, and the other pages of the block, in which necessary data are present, are referred as valid pages. The storage device performs a process referred to as GC (Garbage Collection) such that the block can be used for rerecording data. During the GC, the storage device reads only the valid pages of the block, writes the read pages to another empty block which had been previously erased, and then erases the above-described block to generate a new empty block. All SSDs include their own GC mechanisms, but the GC mechanisms have differences in execution frequency and speed. The GC occupies a very large portion of the WA of the storage device.

Therefore, the GC occupies a considerable portion of many demands for the internal data migration of the storage device, and the GC efficiency may have an influence on the entire write efficiency of the electronic device.

SUMMARY

Various embodiments are directed to a storage device which can process a selected superblock, on which GC is to be performed, when a storage device needs to perform GC related to internal data migration, and thus reduce the valid page count of the superblock to raise the efficiency of the GC, and a control method and recording medium thereof.

In an embodiment, there is provided a control method of a storage device which includes a storage device controller and a memory having a plurality of memory chips. The control method is comprising: providing, by the storage device controller, a superblock valid page count table of a plurality of superblocks and a plurality of internal block valid page count tables each corresponding to a plurality of physical blocks comprised in a corresponding one of the plurality of superblocks, wherein each of the plurality of superblocks corresponds to one group of the plurality of physical blocks belonging to the respective memory chips, which are different from one another and do not overlap one another, each of the plurality of physical blocks corresponds to some of a plurality of pages of a corresponding memory chip among the plurality of memory chips, the superblock valid page count table comprises a total valid page count of the plurality of physical blocks corresponding to each of the plurality of superblocks, and each of the plurality of internal block valid page count tables comprises a plurality of valid page counts respectively corresponding to the plurality of physical blocks of the corresponding superblock; providing, by the storage device controller, a plurality of virtual block mapping tables of the respective memory chips, and mapping a first superblock of the plurality of superblocks, associated with one physical block address, to a second superblock of the plurality of superblocks; deciding, by the storage device controller, at least one selected superblock which is to be processed to perform a garbage collection operation, among the plurality of superblocks, according to the superblock valid page count table; reducing, by the storage device controller, the total valid page count of the at least one selected superblock by remapping the at least one selected superblock according to the plurality of internal block valid page count tables and the plurality of virtual block mapping tables; and performing a garbage collection operation on the remapped at least one selected superblock.

In an embodiment, there is provided a storage device including a memory comprising a plurality of memory chips; and a storage device controller electrically coupled to the memory and configured to control the memory to perform data access, and perform a plurality of operations. The plurality of operations comprise operations of: (a) providing a superblock valid page count table of a plurality of superblocks and a plurality of internal block valid page count tables each corresponding to a plurality of physical blocks comprised in a corresponding one of the plurality of superblocks, wherein each of the plurality of superblocks corresponds to one group of the plurality of physical blocks which belong to the respective memory chips, which are different from one another, and which do not overlap one another, each of the plurality of physical blocks corresponds to some of a plurality of pages of a corresponding memory chip among the plurality of memory chips, the superblock valid page count table comprises a total valid page count of the plurality of physical blocks corresponding to each of the plurality of superblocks, and each of the plurality of internal block valid page count tables comprises a plurality of valid page counts respectively corresponding to the plurality of physical blocks of the corresponding superblock; (b) providing a plurality of virtual block mapping tables of the plurality of memory chips, and mapping a first superblock of the plurality of superblocks, associated with one physical block address, to a second superblock of the plurality of superblocks; (c) deciding at least one selected superblock which are to be processed to perform a garbage collection operation, among the plurality of superblocks, according to the superblock valid page count table; (d) reducing the total valid page count of the at least one selected superblock by remapping the at least one selected superblock according to the plurality of internal block valid page count tables and the plurality of virtual block mapping tables; and (e) performing a garbage collection operation on the remapped at least one selected superblock.

In an embodiment, the memory system comprises non-volatile memory devices each including plural superblocks and a controller. The controller is configured to select a victim superblock including a smaller number of valid pages than any among remaining superblocks, exchange a greater-valid-pages block with a smaller-valid-pages block, and control the memory device to perform a garbage collection operation on the victim superblock, wherein the greater-valid-pages block is included in the victim superblock and the smaller-valid-pages block is included in one among the remaining superblocks, and wherein the smaller-valid-pages block has a smaller number of valid pages than the greater-valid-pages block.

BRIEF DESCRIPTION OF THE DRAWINGS

FIG. 8B is a diagram for describing an embodiment of a process of remapping internal blocks of selected superblocks.

FIG. 9A is a diagram for describing an embodiment illustrating a mapping relationship among internal blocks of superblocks.

DETAILED DESCRIPTION

In order to promote understandings of the purpose, features and effects of the present disclosure, the present disclosure will be described in detail with reference to the following specific embodiments and the accompanying drawings.

Figure 1:
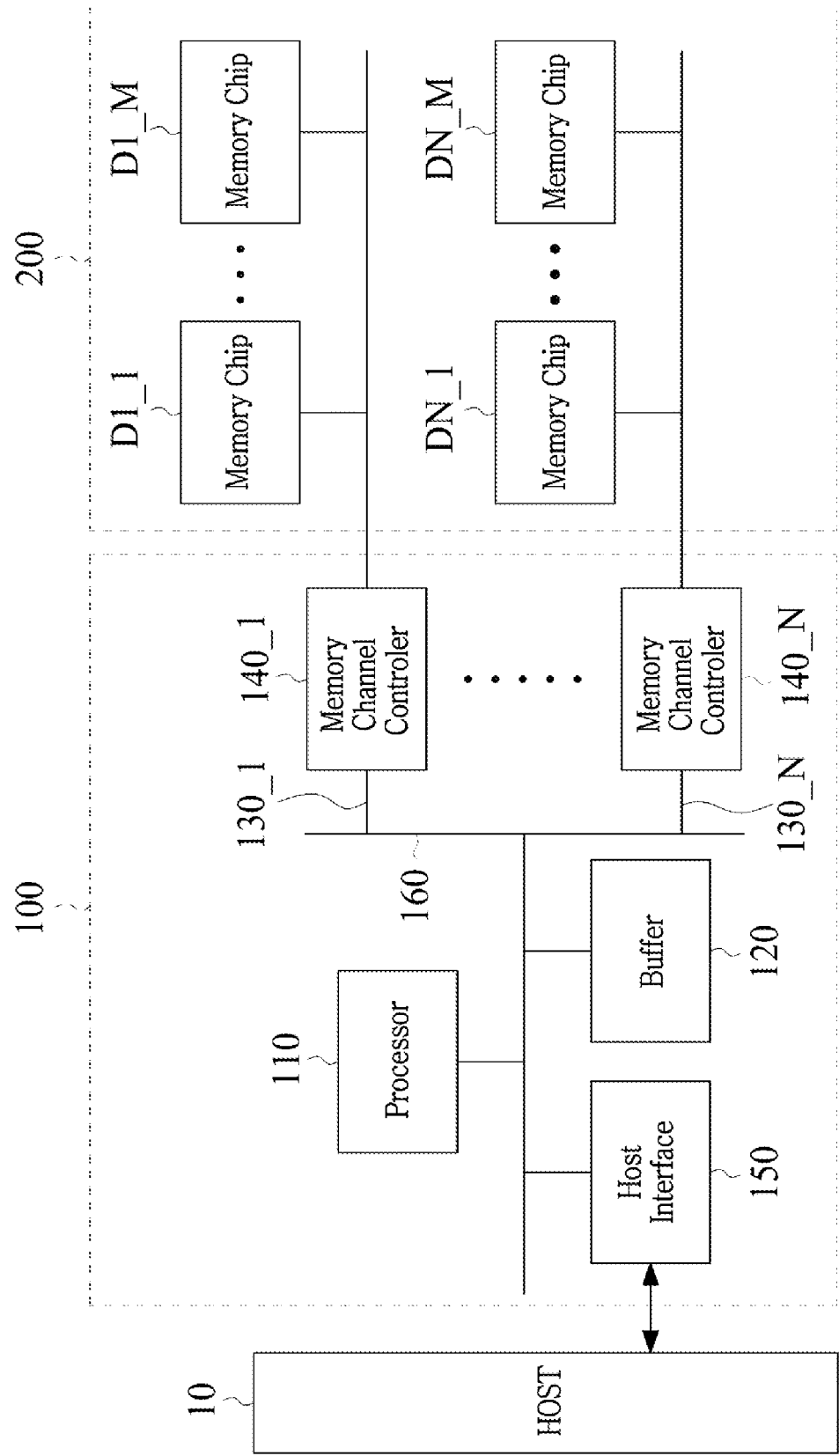
FIG. 1 is a block diagram illustrating an embodiment of a storage device.

FIG. 1 illustrates an embodiment of a storage device in accordance with the present disclosure. The storage device of FIG. 1 may be used to implement a control method of FIG. 3, 5 or 10, which will be described below in detail. When the storage device needs to perform GC in relation to internal data migration, the storage device may reduce the valid page count of a selected superblock by remapping internal blocks of the selected superblock on which the GC is to be performed, thereby improving GC efficiency. As illustrated in FIG. 1, the storage device includes a storage device controller 100 and a memory 200. The storage device controller 100 includes a processor 110, a buffer 120, a plurality of memory channels 130_1 to 130_N and a plurality of memory channel controllers 140_1 to 140_N corresponding to the respective memory channels 130_1 to 130_N, where N is an integer larger than 1. The buffer 120 may be implemented as a volatile memory or nonvolatile memory. The memory 200 includes a plurality of memory chips D1_1 to D1_M, . . . , DN_1 to DN_M where N and M are integers larger than 1. For example, the memory chips are nonvolatile memory devices such as flash memories, for example, NOR-type memories or NAND-type memories. However, the implementation of the present disclosure is not limited thereto.

The storage device controller 100 communicates with a host 10 through a host interface 150 in order to receive a read request or write request from the host 10. The storage device controller 100 generates a read command or write command corresponding to the read request or write request of the host, and transmits the generated command to the memory channel controller 140_1 to 140_N of the corresponding memory channel (for example, 130_1 to 130_N). The memory channel controller 140_1 to 140_N serves to control at least one memory chip. For example, the memory channel controller 140_1 to 140_N transmits a data read command to any one memory chip, and transmits read data to the storage device controller 100, for example, the buffer 120. The storage device controller 100 transmits data, requested by the host 10, to the host 10. For another example, the memory channel controller 140_1 to 140_N records data, which are to be written according to a data write command, into a memory chip. When the storage device controller 100 controls the memory 200, the buffer 120 may store data for various operations such as a read operation, a write operation, a program operation and an erase operation through the storage device controller 100 and the memory 200. In FIG. 1, the plurality of memory channel controllers 140_1 to 140_N control read or write operations through a parallel processing method. The processor 110 is electrically coupled to the memory channels (for example, 130_1 to 130_N) through a bus 160, but the implementation of the present disclosure is not limited to the above-described example. For example, each of the above-described memory channel controllers may be implemented as a logical circuit or programmable circuit or implemented in software, and executed through the processor 110.

The host interface 150 may process commands and data provided from the host 10, and communicate with the host 10 through at least one protocol of various interface protocols such as USB (Universal Serial Bus), MMC (Multi-Media Card), PCI-E (Peripheral Component Interconnect-Express), SAS (Serial Attached) SCSI, SATA (Serial Advanced Technology Attachment), PATA (Parallel Advanced Technology Attachment), SCSI (Small Computer System Interface), ESDI (Enhanced Small Disk Interface) and IDE (Integrated Development Environment).

Figure 2:
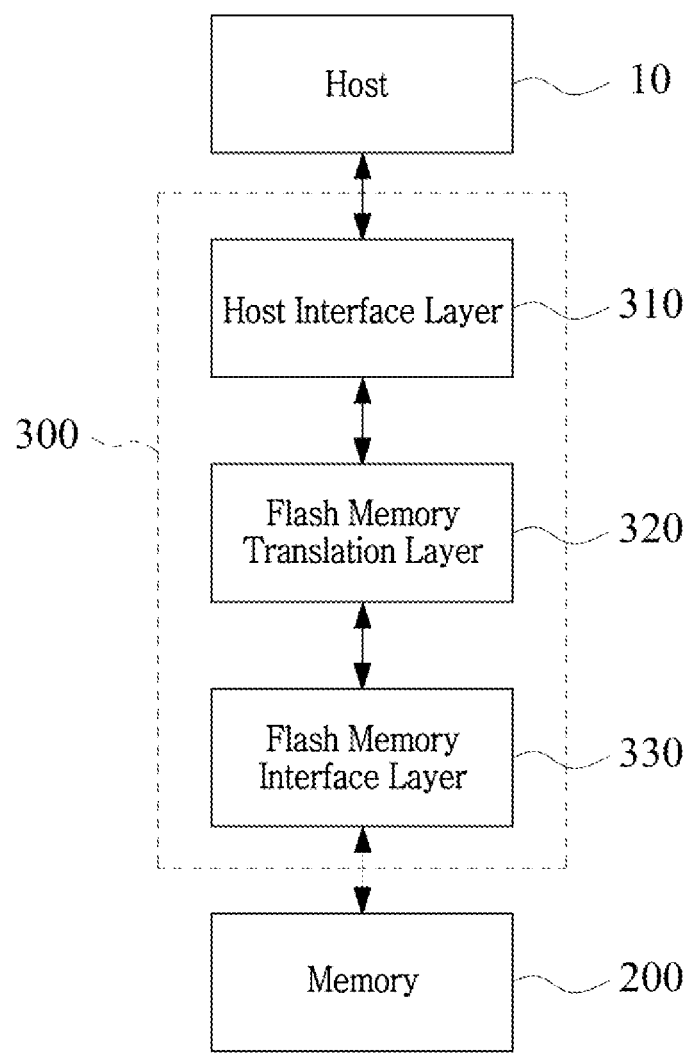
FIG. 2 is a block diagram illustrating an embodiment of a controller of the storage device.

Referring to FIGS. 1 and 2, FIG. 2 is a block diagram illustrating an embodiment of the storage device controller. FIG. 2 illustrates an architecture in the case that a storage device controller 300 is implemented in firmware or software. For example, the storage device controller 300 includes a host interface layer 310, a flash memory translation layer 320 and a flash memory interface layer 330. The host interface layer 310 is used as an interface between the host 10 and the storage device controller 300, while communicating with the host 10. The flash memory translation layer 320 serves to manage read, write and erase operations. The flash memory translation layer 320 also serves to translate a logical address (for example, a logical block address or logical page address) into a physical address (for example, a physical block address or physical page address) corresponding to a memory chip (for example, D1_1 to D1_M, . . . , DN_1 to DN_M) of the memory 200. The flash memory interface layer 330 serves to process communication between the flash memory translation layer 320 and the memory 200. For example, the flash memory interface layer 330 transmits a command from the flash memory translation layer 320 to the memory 200.

The storage device controller 300 illustrated in FIG. 2 may be implemented through the hardware architecture of FIG. 1. The flash memory translation layer 320 needs to refer to and protect an address mapping table when translating a logical address into a physical address. Since the address mapping table contains a large amount of data, the flash memory translation layer 320 stores a section of the address mapping table in a cache. When a logical address and a physical address, which are required for translation, have no corresponding relationship in the cache, the flash memory translation layer 320 needs to generate a mapping table read command by updating the contents of the section of the address mapping table in the cache. Furthermore, certain memory products, for example, an eMMC (embedded MMC) or other memory products each have an address mapping table stored in a memory thereof, and the present disclosure is not limited to such an example.

The storage device controller 300 controls various operations of the memory 200, for example, a write operation, a read operation, a programming operation and an erase operation. For example, the storage device controller may generate a write command and execute the generated write command, according to a write request of the host 10. The storage device controller may store a write command of the host using a command queue. The storage device controller may perform a data write operation by sequentially processing write commands of the host, stored in the command queue.

In an embodiment, the storage device controller 300 controls a firmware algorithm used in the flash memory translation layer 320. For example, the storage device controller 300 may implement algorithms including GC (Garbage Collection), WL (Wear Leveling), BC (Block Reclaim) and RBB (Runtime Bad Block). Therefore, when any one algorithm of GC, WL, BC and RBB is performed, a demand for internal data migration is also present in the storage device.

When the storage device migrates internal data and writes host data, the write efficiency may be reduced or destabilized. When the storage device controller needs to migrate a large amount of internal data, the migration may have an influence on the execution efficiency of the write commands from the host, thereby reducing the write efficiency of the electronic device. On the other hand, when there are a relatively small number of demands for internal data migration or there is no demand for internal data migration in the storage device controller, the write efficiency is improved. In order to promote the data write efficiency or stability of the host, an embodiment of a control method of a storage device is suggested as follows.

Figure 3:
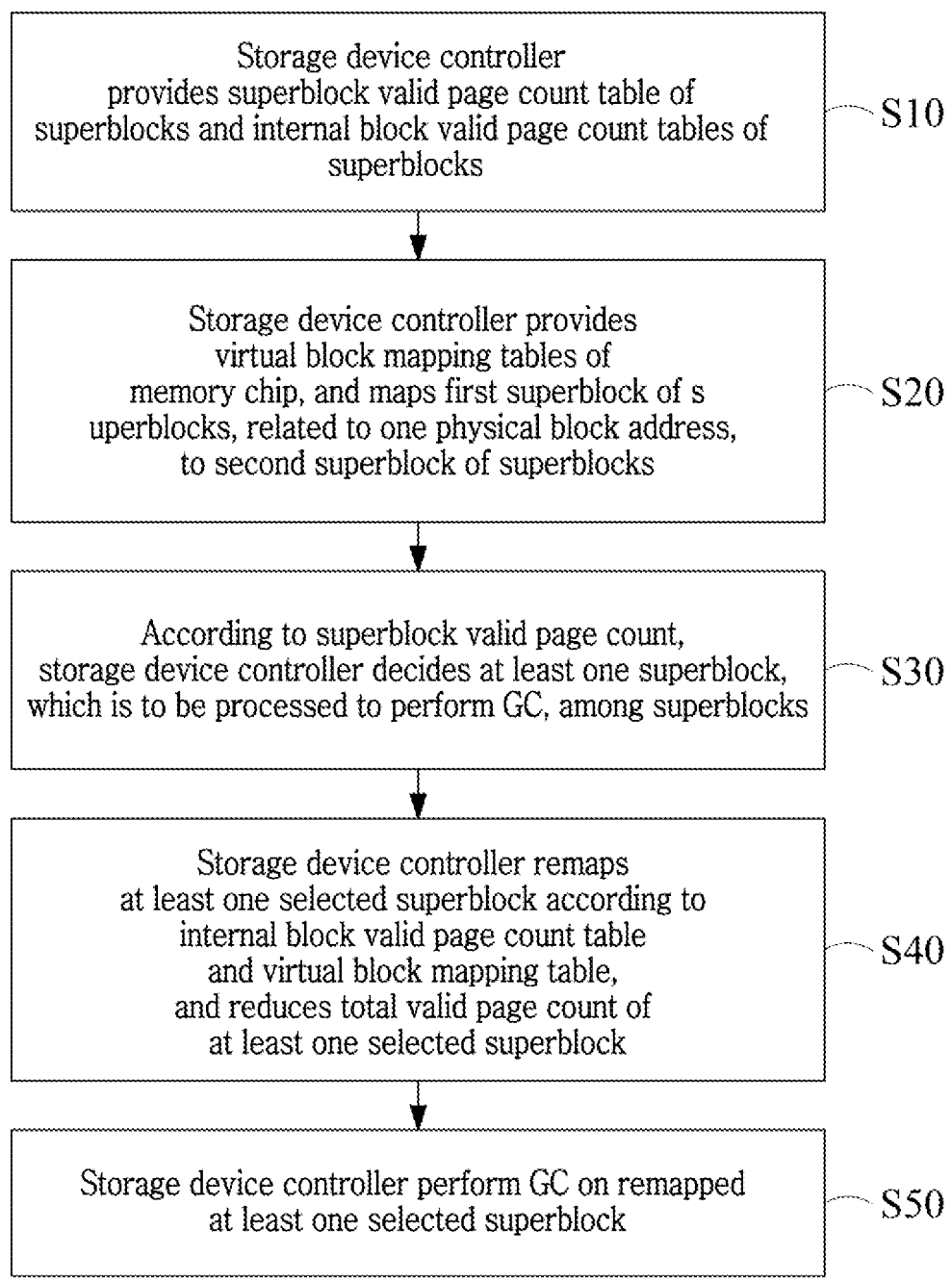
FIG. 3 is a flowchart illustrating an embodiment of a control method of a storage device.

FIG. 3 is a flowchart illustrating an embodiment of a control method of a storage device. The embodiment illustrated in FIG. 3 may be applied to a device with a memory. When a storage device needs to perform GC in relation to internal data migration, the storage device may reduce the valid page count of a selected superblock by performing the GC on the selected superblock, thereby increasing the efficiency of the GC. Referring to FIGS. 1 and 3, the embodiment of the control method of the storage device includes operations S10 to S50. For convenience of description, the device of FIG. 1 is taken as an example. However, the implementation of the control method is not limited to the example.

In operation S10, the storage device controller 100 provides a superblock valid page count table of a plurality of superblocks and a plurality of internal block valid page count tables of the superblocks. Each of the superblocks corresponds to a plurality of physical blocks which belong to one group of respective memory chips among the plurality of memory chips (for example, D1_1 to D1_M, . . . , DN_1 to DN_M) of the storage device and which do not overlap each other. Each of the physical blocks corresponds to some of a plurality of pages in one corresponding memory chip (for example, one of D1_1 to D1_M, . . . , DN_1 to DN_M) of the memory chips. The superblock valid page count table includes total valid page counts of the respective superblocks. Each of the internal block valid page count tables includes a plurality of valid page counts which respectively correspond to the plurality of physical blocks of a corresponding one among the superblock. The superblock valid page count table corresponds to the plural superblocks. The internal block valid page count table corresponds to a single superblock. The internal block valid page count table corresponds to the plural physical blocks configuring the corresponding superblock.

In operation S20, the storage device controller 100 provides a plurality of virtual block mapping tables of the respective memory chips, and maps a first superblock of the superblocks, associated with a physical block address, to a second superblock of the superblocks.

In operation S30, the storage device controller 100 decides at least one selected superblock on which a GC operation is to be performed, among the superblocks, according to the superblock valid page count table. For example, according to the total valid page count of each of the superblocks, the storage device controller 100 decides a superblock, whose total valid page count is the lowest or relatively low, as the at least one selected superblock.

In operation S40, the storage device controller 100 reduces the total valid page count of the at least one selected superblock by remapping the at least one selected superblock according to the internal block valid page count tables and the virtual block mapping tables. For example, in operation S50, the storage device controller 100 performs a GC operation on the remapped at least one selected superblock.

Through this process, the above-described embodiment may provide a storage device, and a control method and recording medium thereof, which can be applied to a device with a memory. The embodiment may be applied to a device with a memory. When the storage device needs to perform GC in relation to internal data migration, the storage device may remap internal blocks of a selected superblock, on which the GC is to be performed, and thus reduce the valid page count of the selected superblock, thereby improving the efficiency of the GC. Through this operation, it is possible to provide a storage device capable of further improving the entire write efficiency of an electronic device which uses the storage device, and a control method and recording medium thereof.

Hereafter, operations S10 to S50 of FIG. 3 will be described with examples.

Figure 4:
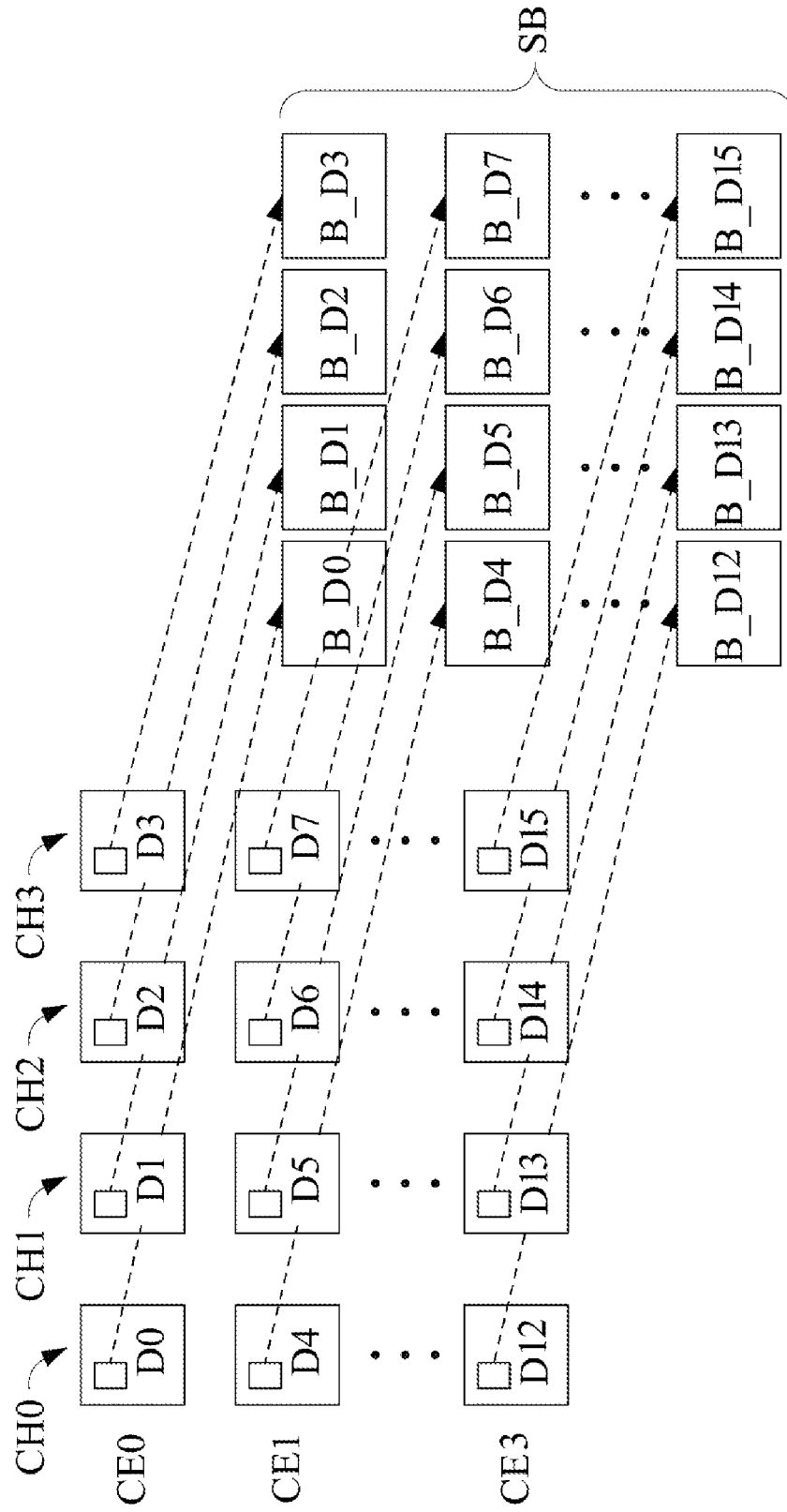
FIG. 4 is a diagram for describing an embodiment of a superblock.

Referring to FIG. 4 which is a diagram for describing an embodiment of the superblock in operation S10, one superblock SB corresponds to one group of physical blocks (for example, B_D0 and B_D1 to B_D15) which belong to a plurality of physical blocks (for example, D0 and D1 to D15) and do not overlap one another. The plurality of physical blocks (for example, B_D0 and B_D1 to B_D15) correspond to some of the plurality of pages of one corresponding memory chip (for example, D0, D1 or D15) among the memory chips. In other words, the superblock SB is a group of physical blocks (for example, B_D0 and B_D1 to B_D15) in the respective memory chips (for example, D0 and D1 to D15). Furthermore, the storage device controller may select other physical blocks which do not overlap the physical blocks (for example, B_D0 and B_D1 to B_D15) of the superblock SB in the respective memory chips (for example, D0 and D1 to D15), and constitute another superblock. In this way, the storage device controller constructs a plurality of superblocks, and each of the superblocks corresponds to one group of physical blocks which belong to the memory chips (for example, D0 and D1 to D15) and do not overlap one another.

In some embodiments, the storage device controller 300 may be implemented as the flash memory translation layer 320 illustrated in FIG. 2, and the flash memory translation layer 320 may use the superblock SB as a block allocation circuit. In an embodiment in which the storage device is implemented according to FIGS. 1, 2 and 4, the memory chips D0 and D4 to D12 may correspond to a memory channel CH0 of the storage device, the memory chips D1 and D5 to D13 may correspond to a memory channel CH1 of the storage device, the memory chips D2 and D6 to D14 may correspond to a memory channel CH2 of the storage device, and the memory chips D3 and D7 to D15 may correspond to a memory channel CH3 of the storage device. In the above-described embodiment, a plurality of chip enable signals CE in the storage device may be implemented to control the corresponding memory chips. Thus, the multiple memory channels may be applied to perform read or write operations of the plurality of memory chips, which makes it possible to improve the read/write efficiency. For example, FIG. 4 illustrates corresponding relations through eight enable signals represented by CE0 and CE1 to CE3. For example, the enable signal CE0 may be applied to the memory chips D0 to D3, and the other enable signals may be inferred in such a manner. However, the implementation of the present disclosure is not limited to such an example.

The control method illustrated in FIG. 3 includes processing a superblock. Thus, in order to promote the implementation of the control method, a look-up table related to a plurality of superblocks is suggested in operations S10 and 20. The look-up table includes a superblock valid page count table of the plurality of superblocks, a plurality of internal block valid page count tables of the respective superblocks, and a plurality of virtual block mapping tables of the respective memory chips.

In operation S10, the superblock valid page count table includes the total valid page counts of the respective superblocks. For example, when there are 20 superblocks, the superblock valid page count table may include 20 entries respectively corresponding to the 20 superblocks, and the total valid page counts of the respective superblocks may be recorded into the respective entries. For example, the storage device controller of FIG. 1 or 2 may construct the superblock valid page count table and set the initial values thereof. While the storage device controller is operated, the total valid page counts of the respective superblocks may be recorded, calculated or updated. Such a method may be implemented through the flash memory translation layer 320.

In the control method illustrated in FIG. 3, the storage device controller (or the flash memory translation layer) further provides a plurality of internal block valid page count tables. More specifically, the physical blocks (for example, B_D0 and B_D1 to B_D15) included in each of the superblocks (SB of FIG. 4) may be referred to as internal blocks. Therefore, the storage device controller (or the flash memory translation layer) provides the superblock SB of FIG. 4 with an internal block valid page count table corresponding to the superblock SB. An example of the superblock SB of FIG. 4 will be described as follows. The internal block valid page count table includes an equal number (for example, 16) of entries respectively corresponding to the plurality of physical blocks (for example, B_D0 and B_D1 to B_D15) of the superblock SB. That is, the internal block valid page count table includes valid page counts recorded in the entries respectively corresponding to the physical blocks within the superblock SB. The valid page count in each entry may represent a number of valid pages within the corresponding physical block.

Figure 5:
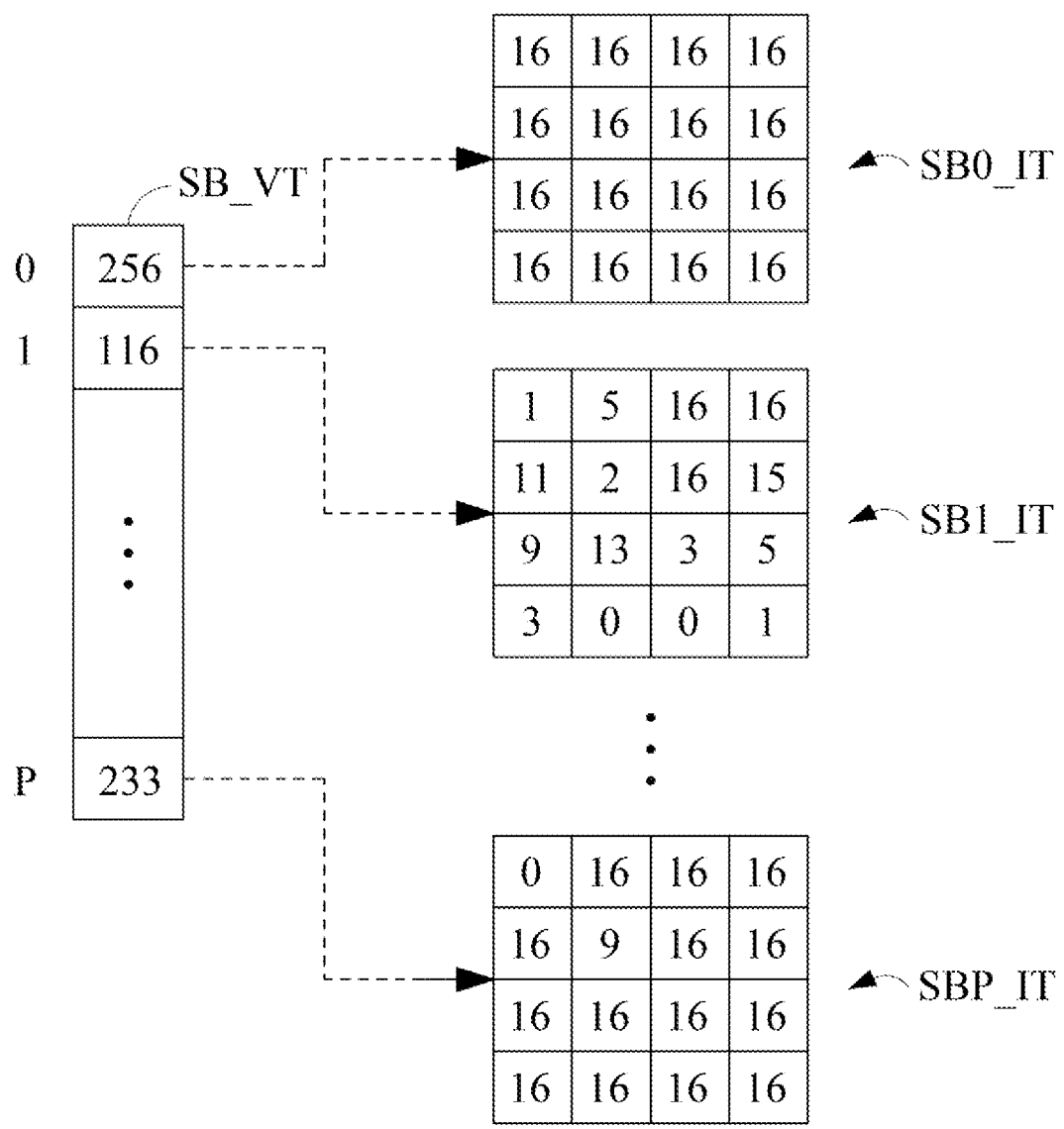
FIG. 5 is a diagram for describing an embodiment of a plurality of internal block valid page count tables of superblocks.

FIG. 5 is a diagram for describing an embodiment of the plurality of internal block valid page count tables for the superblocks. In the embodiment of the storage device of FIG. 1 or 2, the storage device controller of the storage device may be configured to provide (P+1) superblocks where P is an integer equal to or more than 1. The superblocks may be represented by reference numerals SB0 and SB1 to SBP. As illustrated in FIG. 5, a superblock valid page count table SB_VT of the (P+1) superblocks includes (P+1) entries. In each of the entries, the total valid page count of the corresponding superblock is recorded. As illustrated in FIG. 5, (P+1) internal block valid page tables SB0_IT and SB1_IT to SBP_IT may be provided to correspond to the (P+1) superblocks, respectively. In each of the internal block valid page count tables, the valid page counts of the respective physical blocks of the corresponding superblock (for example, SB0 and SB1 to SBP) are recorded. For example, when the storage device includes Q memory chips (for example, 16 (=4×4) memory chips), each of the superblocks includes Q physical blocks, where Q=N×M, and N and M are integers larger than 1. Thus, the internal block valid page count table corresponding to each of the superblocks includes Q entries, and individual valid page counts of all internal blocks of the superblock (for example, SB0, SB1 or SBP) are recorded into the Q entries, respectively. For example, the storage device controller of FIG. 1 or 2 may construct the internal block valid page count table corresponding to each of the superblocks and set the initial values thereof. While the storage device controller is operated, the individual valid page counts of internal blocks in each of the superblocks may be recorded, calculated or updated. Such a method may be implemented through the flash memory translation layer 320. However, the implementation of the present disclosure is not limited to the above-described embodiment.

Figure 6:
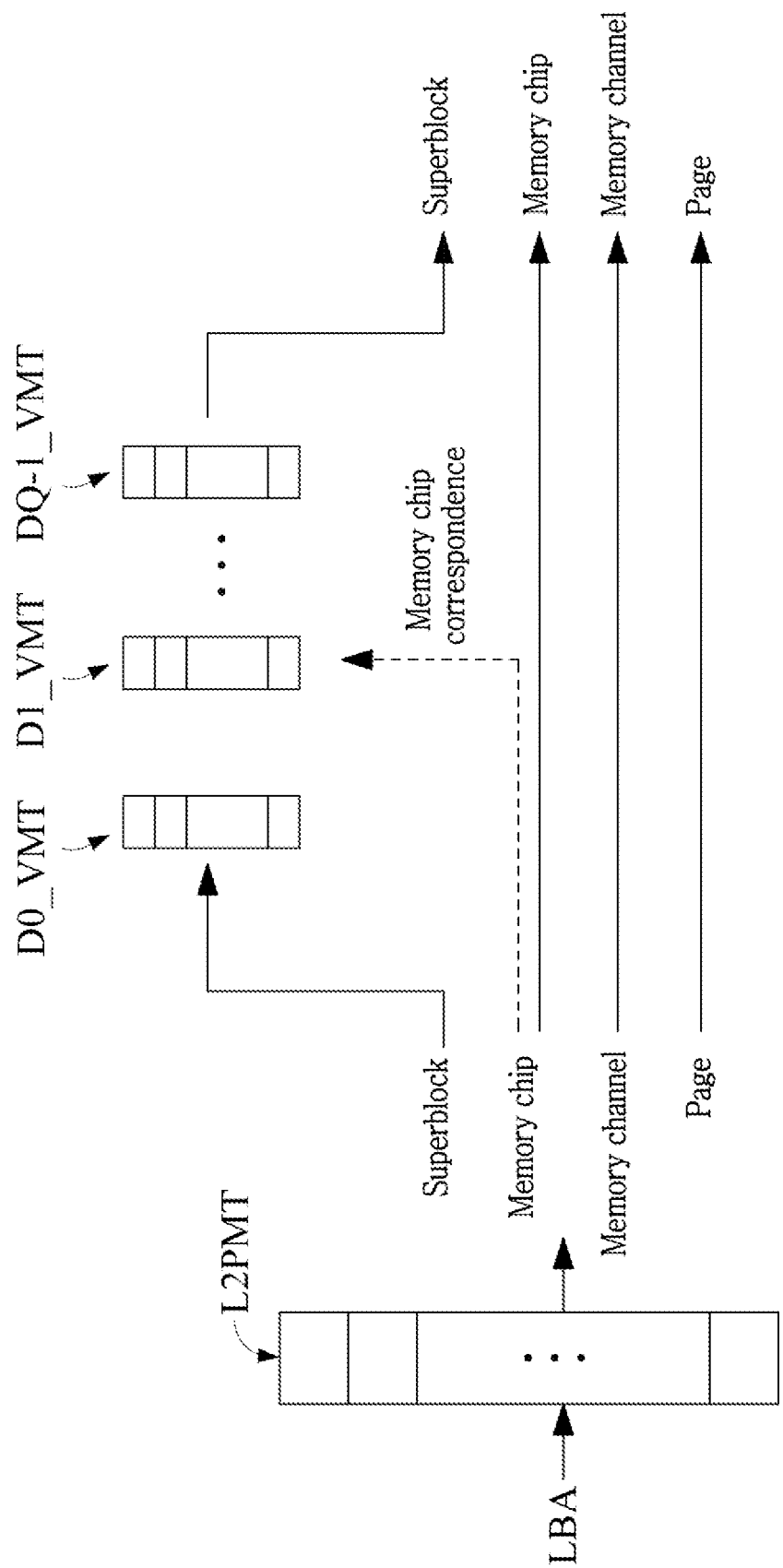
FIG. 6 is a diagram for describing an embodiment of a plurality of virtual block mapping tables of respective memory chips.

In relation to operation S20, FIG. 6 is a diagram for describing an embodiment of a plurality of virtual block mapping tables of the respective memory chips. In the embodiment of the storage device of FIG. 1 or 2, the memory of the storage device includes Q memory chips represented by reference numerals D0 and D1 to DQ-1. As illustrated in FIG. 6, the storage device controller may be configured to provide Q virtual block mapping tables D0_VMT and D1_VMT to DQ-1_VMT corresponding to the Q memory chips, respectively. For example, the virtual block mapping table may be used to map a first superblock, among the superblocks associated with one physical block address acquired from one logical-to-physical mapping table L2PMT, to a second superblock among the superblocks. The physical block address may correspond to a logical block address LBA. The physical block address may be implemented to indicate a memory chip corresponding to one physical block and a page of the memory chip (for example, a page represented by a number), or indicate a memory channel corresponding to a physical block, the memory chip of the memory channel, and a page of the memory chip (for example, a page represented by a number), or implemented through another suitable method. For example, at the initial stage, the storage device controller may be configured to record the plurality of pages of the memory chip D0 into the virtual block mapping table D0_VMT according to the value of a superblock allocated to the pages, such that the plurality of pages correspond to the same superblock, and the other virtual block mapping tables may also be processed in a similar manner as in initialization. Through this operation, the initialization virtual block mapping tables may promote the at least one selected superblock to be remapped, when operation S40 of the control method in FIG. 3 is performed, which makes it possible to reduce the total valid page count of the selected superblock. However, the implementation of the present disclosure is not limited to the above-described example.

In an embodiment related to operation S30, the storage device controller decides the superblock having the minimum total valid page count as the at least one selected superblock, according to a change in the total valid page count of each of the superblocks. In another embodiment, the storage device controller decides at least one selected superblock according to whether the total valid page count of each of the superblocks satisfies a determination condition. For example, when the determination condition is a threshold value of the total valid page count, the storage device controller decides a superblock, whose total page count is smaller than or equal to the threshold value of the total valid page count, as the at least one selected superblock.

Figure 7:
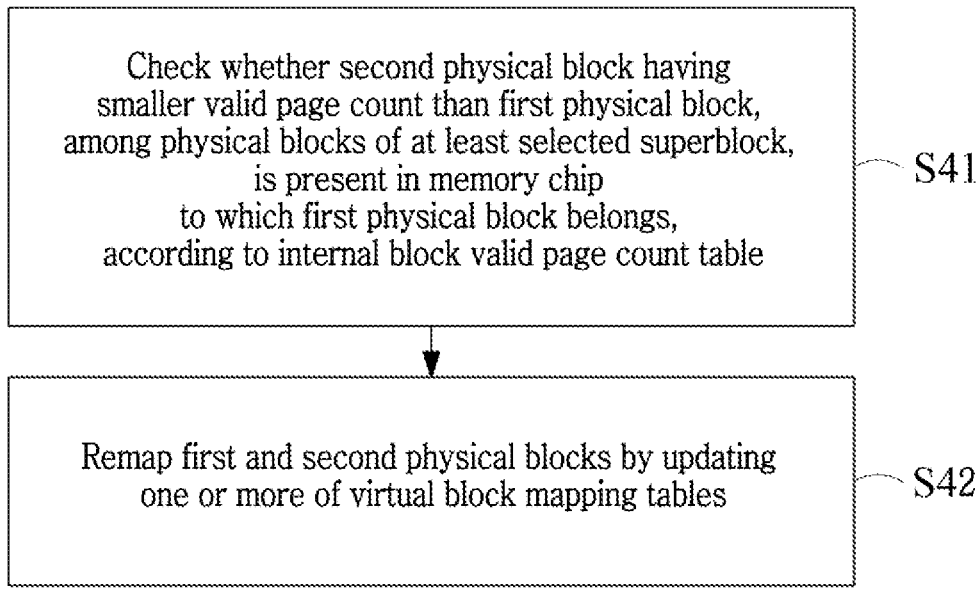
FIG. 7 is a flowchart illustrating an embodiment of operation S40 in FIG. 3.

In relation to operation S40, FIG. 7 is a flowchart illustrating an embodiment of operation S40 in FIG. 3. In the embodiment, operation S40 includes operations S41 and S42.

In operation S41, the storage device controller checks whether a second physical block is present in a memory chip to which a first physical block among the plurality of physical blocks of the at least one selected superblock belongs, according to the internal block valid page count table, and the valid page count of the second physical block is smaller than the valid page count of the first physical block.

In operation S42, when it is checked that the second physical block having a smaller valid phage count than the first physical block is present in the memory chip to which the first physical block among the plurality of physical blocks of the at least one selected superblock belongs, the storage device controller remaps the first physical block and the second physical block by updating one or more of the virtual block mapping tables.

In some embodiments, when two or more superblocks are selected, the storage device controller may perform a remapping operation on each of the selected superblocks, using operations S41 and S42. When operation S41 is performed on any one of the selected superblocks, a corresponding second physical block may not be found. In this case, operation S41 may be continuously performed on the other selected superblocks.

Figure 8A:
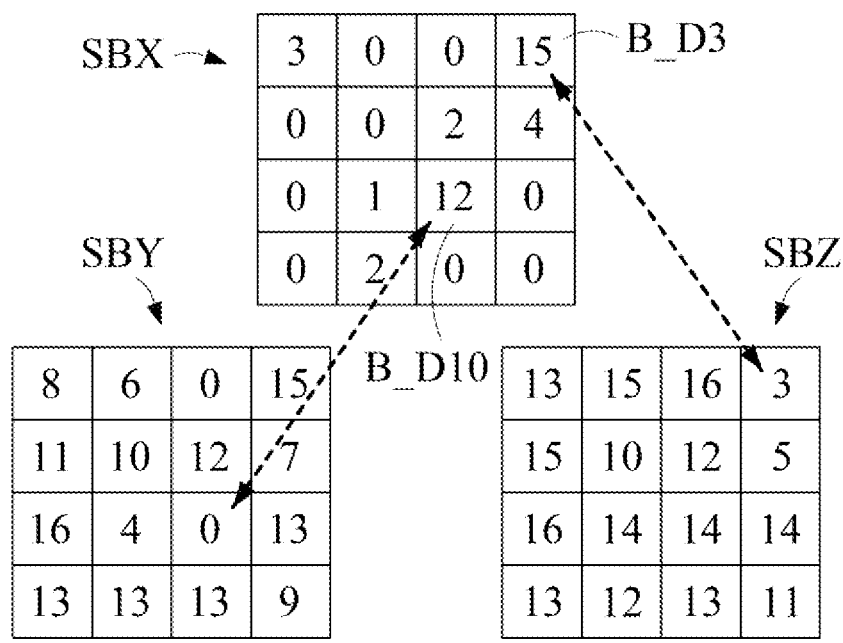
FIG. 8A is a diagram for describing an embodiment of a process of remapping internal blocks of selected superblocks.

In relation to operation S41, FIG. 8A is a diagram for describing an embodiment in which internal blocks of a selected superblock are remapped. FIG. 8A illustrates a selected superblock represented by SBX as one square matrix. The grids of the square matrix represent the respective internal blocks of the selected superblock, and a number in each of the grids represents the valid page count of the corresponding internal block. However, FIG. 8A and other drawings are only examples for convenience of description. Thus, it is to be noted that the implementation of the present disclosure is not limited to the examples or drawings of this document, and the present disclosure may be variously implemented in suitable software (for example, data architecture or database), hardware or firmware.

For example, when the total valid page count (for example, represented by VPC) of the selected superblock SBX is 39 according to the superblock valid page count table, the storage device controller may select a suitable number of physical blocks from the plurality of physical blocks (i.e., internal blocks) of the selected superblock SBX and perform operations S41 and S42, in order to further reduce the total valid page count of the selected superblock SBX. Thus, the storage device controller may effectively reduce the total valid page count of the selected superblock SBX. In an embodiment, when the storage device controller finds an internal block valid page count, which is larger than or equal to the threshold value (for example, 10) of the internal block valid page count, among the internal blocks of the selected superblock SBX, the storage device controller may perform operation S41. For example, referring to FIG. 8A, two or more internal blocks may satisfy the threshold value of the internal block valid page count. In this case, when the block naming method of FIG. 4 is continuously used, internal block valid page counts corresponding to the two internal blocks B_D3 and B_D10, respectively, are 15 and 12, and memory chips corresponding to the two internal blocks B_D3 and B_D10, respectively, are the memory chips D3 and D10. Through this process, the threshold value of the internal block valid page count can prevent the storage device controller from finding an unsuitable number of internal blocks when operation S41 is implemented. Thus, the execution efficiency of operations S41 and S42 may be promoted. On the other hand, when operation S41 is performed on the internal blocks whose internal block valid page counts are 1, 2 or 3, the time and the resource computation may be wasted.

In operation S41, the storage device controller determines whether internal blocks having a relatively low internal block valid page count are present in another superblock and exchanges the internal blocks in order to remap the internal blocks to the described internal blocks B_D3 and B_D10 in operation S42. Thus, the remapped and selected superblock SBX has a relatively low total valid page count. One internal block of the selected superblock SBX to be remapped, for example, the internal block B_D3 (or the first physical block) may be taken as an example for description. In order to maintain favorable efficiency, the storage device controller needs to search for an internal block (or the second physical block) having a relatively low internal block valid page count in the same memory chip D3 to which the internal block B_D3 belongs.

In the example of FIG. 8A, an internal block B_D3 of another superblock SBZ and the internal block B_D3 of the selected superblock SBX belong to the same memory chip D3, and the internal block valid page count (for example, 3) of the internal block B_D3 of the superblock SBZ is smaller than the internal block valid page count (for example, 15) of the internal block B_D3 of the selected superblock SBX. Similarly, an internal block B_D10 of another superblock SBY and the internal block B_D10 of the selected superblock SBX belong to the same memory chip D10, and the internal block valid page count (for example, 0) of the internal block B_D10 of the superblock SBY is smaller than the internal block valid page count (for example, 12) of the internal block B_D10 of the selected superblock SBX. Therefore, the internal block B_D3 of the superblock SBZ and the internal block B_D10 of the superblock SBY may be set to the second physical block of operation S41, in order to additionally perform operation S42.

Referring to FIG. 8B, the storage device controller remaps the first physical block (for example, the internal block B_D3 or B_D10 of the superblock SBX) to the second physical block (for example, the internal block B_D3 of the superblock SBZ or the internal block B_D10 of the superblock SBY) by updating one or more of the virtual block mapping tables, when performing operation S42. In other words, the storage device controller exchanges the internal block B_D3 of the superblock SBX with the internal block B_D3 of the superblock SBZ and exchanges the internal block B_D10 of the superblock SBX with the internal block B_D10 of the superblock SBY.

Figure 9A:
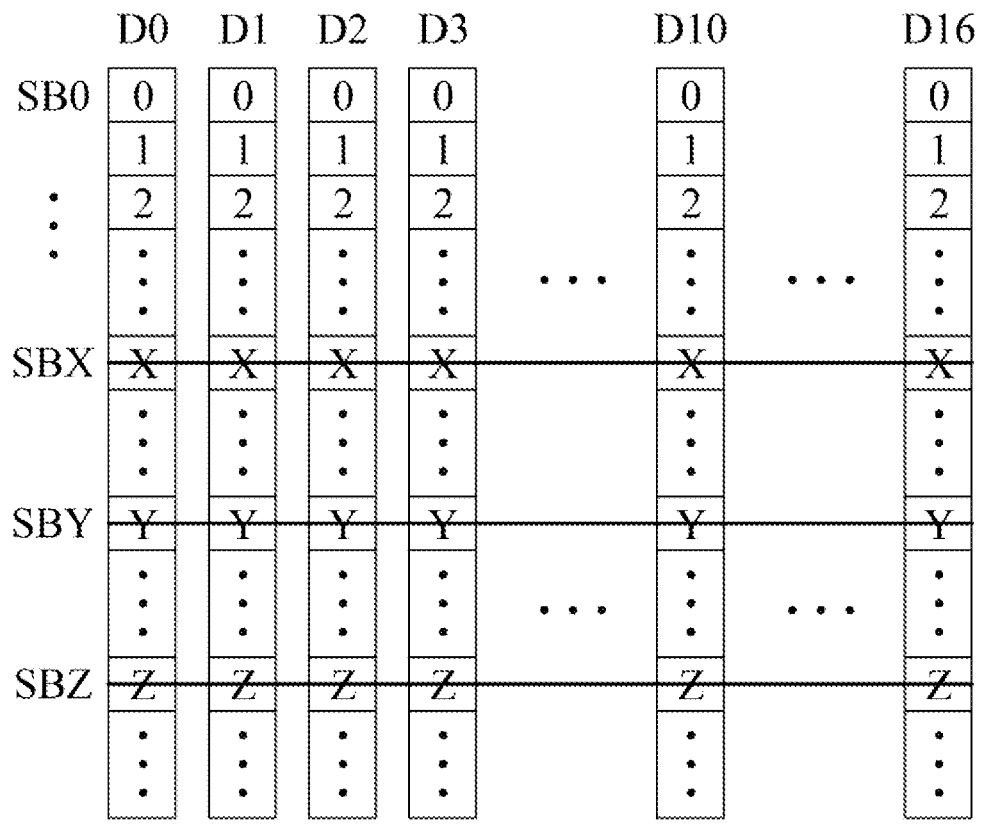
Figure 9B:
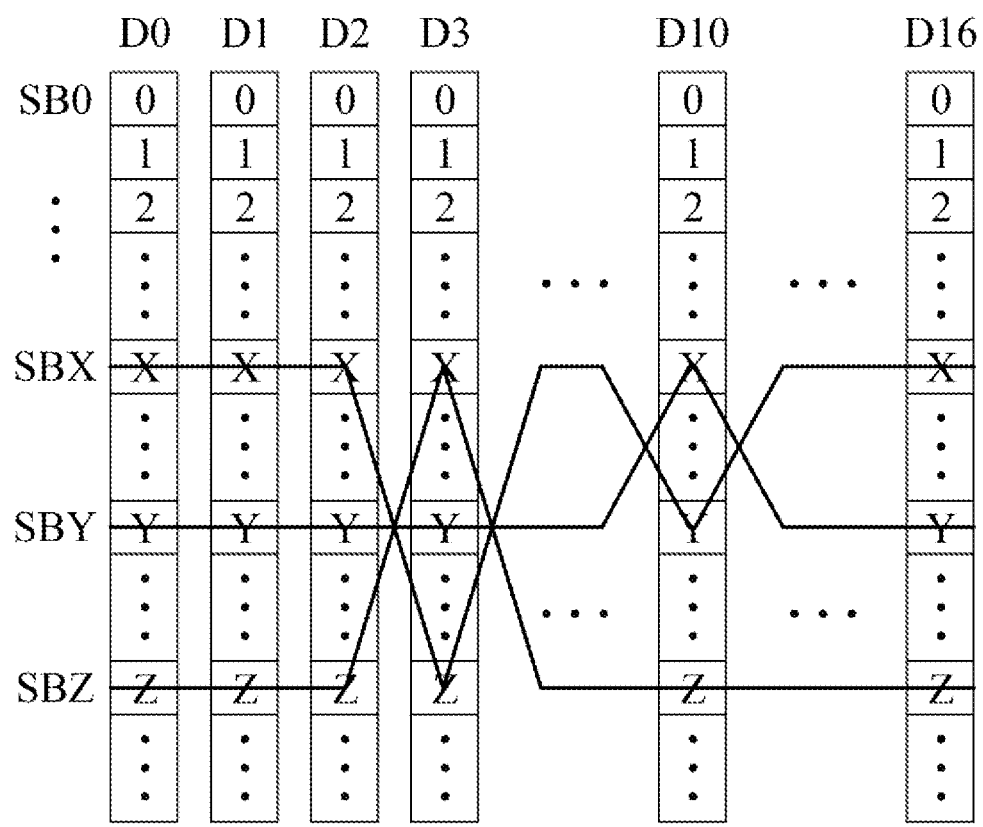
FIG. 9B is a diagram for describing an embodiment illustrating the mapping relationship among the internal blocks of the superblocks after the internal blocks of selected superblocks are mapped.

In an embodiment, in operation S42, the storage device controller remaps the first physical block and the second physical block by updating the virtual block mapping table of the memory chip to which the first physical block (for example, the internal block B_D3 or B_D10 of the superblock SBX) of the at least one selected superblock and the second physical block (for example, the internal block B_D3 of the superblock SBZ or the internal block B_D10 of the superblock SBY) of another superblock belong. FIG. 9A is a diagram illustrating a mapping relationship among internal blocks of superblocks, and FIG. 9B is a diagram illustrating the mapping relationship among the internal blocks of the superblocks after the internal blocks of selected superblocks are remapped. In FIGS. 9A and 9B, each bar-shaped figure corresponds to any one of the memory chips (for example, D0 to D16), and each grid of the bar-shaped figure represents the number of a superblock, to which a block configured as one or more pages belongs, in the corresponding memory chip. For example, the first grid of the bar-shaped figure corresponding to the memory chip D0 has a value of 0, which indicates that the corresponding block belongs to the superblock SB0, and the other blocks may be inferred in this manner. For convenience of description, symbols on the leftmost side of the bar-shaped figures represent the superblocks to which the respective grids correspond at the initial stage, for example, SB0, SBX, SBY and SBZ. When it is assumed that the internal blocks of the superblocks SBX, SBY and SBZ at the initial stage have a mapping relationship as illustrated in FIG. 9A, each of three straight lines crossing the bar-shaped figures in a lateral direction indicates blocks included in the corresponding superblock SBX, SBY or SBZ (or internal blocks of the corresponding superblock). After the remapping process of operation S42, the mapping relationship among the internal blocks of the remapped superblocks SBX, SBY and SBZ may be changed as illustrated FIG. 9B. The above-described three straight lines may be changed to three lines crossing the bar-shaped figures, and each of the three crossing lines indicates blocks included in the corresponding superblock SBX, SBY or SBZ (or internal blocks of the corresponding superblock). FIGS. 9A and 9B are only examples for description, and the implementation of the present disclosure is not limited to the examples.

In an embodiment, the storage device controller updates the virtual block mapping table of the memory chip to include instruction data for mapping the first physical block of the at least one selected superblock to the second physical block of another superblock. Referring back to FIGS. 6, 9A and 9B, the updated mapping relationship of FIG. 9B may be implemented through the virtual block mapping table illustrated in FIG. 6. For example, in the virtual block mapping table D3_VMT corresponding to the memory chip D3, a page corresponding to a physical address to which the internal block B_D3 of the original superblock SBX of the memory chip D3 can be recorded may correspond to the superblock SBZ. A page corresponding to a physical address to which the internal block B_D3 of the original superblock SBZ can be written may correspond to the superblock SBX. Furthermore, in the virtual block mapping table D10_VMT corresponding to the memory chip D10, a page corresponding to a physical address to which the internal block B_D10 of the original superblock SBX of the memory chip D10 can be recorded may correspond to the superblock SBY. A page corresponding to a physical address to which the internal block B_D10 of the original superblock SBY can be recorded may correspond to the superblock SBX. For example, each of the virtual block mapping tables of the respective memory chips, illustrated in FIG. 6, may be arranged to record the number of the corresponding memory chip and the number of the corresponding memory channel, and record the numbers of the superblocks corresponding to the physical pages of the memory chip at the initial stage and the numbers of the superblocks after the remapping process, thereby contributing to the implementation of the remapping process. However, the virtual block mapping tables may be simplified or differently arranged in a suitable situation. Thus, the implementation of the present disclosure is not limited to the above-described example.

Figure 10:
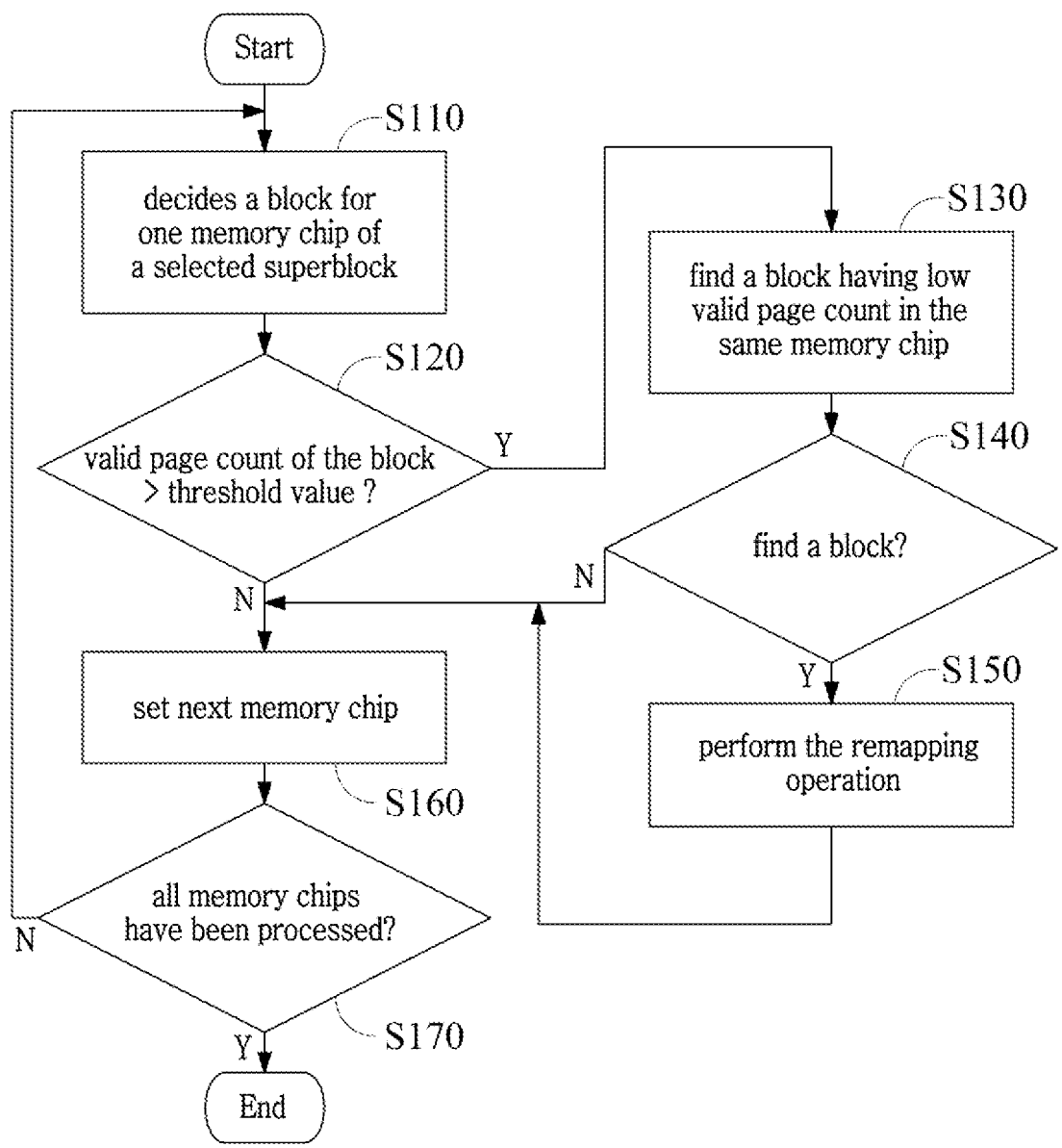
FIG. 10 is a flowchart illustrating another embodiment of operation S40 in FIG. 3.

FIG. 10 is a flowchart illustrating another embodiment of operation S40 in FIG. 3. In operation S110, the storage device controller decides a block (for example, represented by block_x) for one memory chip of a selected superblock. For example, when a parameter DN is set to 0 (DN=0), it indicates that the process is started from the memory chip D0. For example, the storage device controller finds a corresponding block number in the virtual block mapping table (see FIG. 6) corresponding to the memory chip D0. In operation S120, the storage device controller determines whether the internal block valid page count of the block block_x is larger than a threshold value (for example, 5, 10 or another value). When the internal block valid page count of the block block_x is equal to or lower than a threshold value, the storage device controller performs operation S160. When the internal block valid page count of the block block_x is higher than the threshold value, the storage device controller performs operation S130. In operation S130, the storage device controller finds a block (for example, represented by block_y) having a relatively low internal block valid page count in the same memory chip. In operation S140, the storage device controller determines whether the storage device controller can find the block which is to be found in operation S130. When determining that the storage device controller can find the block, the storage device controller operation S150. Otherwise, the storage device controller performs operation S160. In operation S150, the storage device controller performs the remapping operation on the blocks block_x and block_y through the methods illustrated in FIGS. 8B and 9B. In operation S160, the storage device controller sets a next memory chip. For example, the storage device controller may increase the parameter DN by 1 and mark a virtual program code as DN++. In operation S170, the storage device controller determines whether all memory chips have been processed. For example, the storage device controller determines whether the parameter DN is larger than the maximum number of the memory chips (for example, Q=16). When the parameter DN is larger than the maximum number, the storage device controller performs operation S110. Otherwise, the storage device controller stops the flow or performs another operation. Through this process, the storage device controller may implement operation S40 for the superblock selected through the embodiment of FIG. 10, according to the control method of FIG. 4. Even when two or more superblocks are selected, the embodiment of FIG. 10 may be repeated to perform operation S40.

Some embodiments suggest a non-transitory storage medium which stores program codes for controlling an operational component (for example, the storage device illustrated in FIG. 1 or 2) to execute the control method of the storage device through the storage device controller of the storage device. The method includes any one embodiment of the methods illustrated in FIG. 3 or a combination thereof. For example, the program codes may indicate one or more programs or program modules for implementing operations S10 to S50 of FIG. 3, operations S41 and S42 of FIG. 7 or operations S110 to S170 of FIG. 10, and the program codes of such a module may be handled together or executed in a suitable order or in parallel. When the operational component executes such program codes, the operational component may execute one embodiment among the control methods of the storage device in FIG. 3. Examples of the readable recording medium include firmware, ROM, RAM, memory card, optical data storage medium, magnetic data storage medium, or other types of storage media or memories. The implementation of the present disclosure is not limited to such examples.

In the embodiments for the storage device in FIGS. 1 and 2, one or more of the processors 110, the memory channel controller 140_1 to 140_N and the host interface 150 or combinations thereof may be implemented as one or more circuits. For example, the one or more of the processors 110, the memory channel controller 140_1 to 140_N and the host interface 150 or the combinations thereof may be implemented as one or more circuits among a digital signal processor, a microcontroller, and a programmable integrated circuit such as an FPGA (Field Programmable Gate Array) or ASIC (Application Specific Integrated Circuit), or implemented as a dedicated circuit or module. Furthermore, the memory channel controller may also be implemented in a software manner such as a process, thread or program module or another software manner. However, the implementation of the present disclosure is not limited to such an example. Furthermore, operations S41 and S42 of FIG. 7 or operations S130 and S140 of FIG. 10 may be implemented through a hardware circuit such as a logical circuit or another suitable digital circuit. Thus, the efficiency of the process of searching for a physical block having a relatively low internal block valid page count is increased.

Through such an implementation, the embodiments provide a storage device which can be applied to a device with a memory, and a control method and recording medium thereof. The storage device controller provides a superblock valid page count table of a plurality of superblocks and a plurality of internal block valid page count tables of the superblocks and provides a plurality of virtual block mapping tables of the respective memory chips, thereby mapping a first superblock of the superblocks, associated with a physical block address, to a second superblock of the superblocks. Therefore, when the storage device needs to perform GC, the storage device controller can reduce the total valid page count of a selected superblock by remapping the internal blocks of the selected superblock on which GC is to be performed, thereby improving the efficiency of the GC.

While various embodiments have been described above, it will be understood to those skilled in the art that the embodiments described are examples only. Accordingly, the storage device and the control method, which are described herein, should not be limited based on the described embodiments.

What is claimed is:

1. A control method of a storage device which includes a storage device controller and a memory having a plurality of memory chips, the control method comprising:
providing, by the storage device controller, a superblock valid page count table of a plurality of superblocks and a plurality of internal block valid page count tables each corresponding to a plurality of physical blocks comprised in a corresponding one of the plurality of superblocks, wherein each of the plurality of superblocks corresponds to one group of the plurality of physical blocks belonging to the respective memory chips, which are different from one another and do not overlap one another, each of the plurality of physical blocks corresponds to some of a plurality of pages of a corresponding memory chip among the plurality of memory chips, the superblock valid page count table comprises a total valid page count of the plurality of physical blocks corresponding to each of the plurality of superblocks, and each of the plurality of internal block valid page count tables comprises a plurality of valid page counts respectively corresponding to the plurality of physical blocks of the corresponding superblock;

providing, by the storage device controller, a plurality of virtual block mapping tables of the respective memory chips, and mapping a first superblock of the plurality of superblocks, associated with one physical block address, to a second superblock of the plurality of superblocks;

deciding, by the storage device controller, at least one selected superblock which is to be processed to perform a garbage collection operation, among the plurality of superblocks, according to the superblock valid page count table;

reducing, by the storage device controller, the total valid page count of the at least one selected superblock by remapping the at least one selected superblock according to the plurality of internal block valid page count tables and the plurality of virtual block mapping tables; and performing a garbage collection operation on the remapped at least one selected superblock, wherein the reducing of the total valid page count of the at least one selected superblock by remapping the at least one selected superblock according to the plurality of internal block valid page count tables and the plurality of virtual block mapping tables comprises:

checking whether a second physical block having a smaller valid page count than a first physical block, among the plurality of physical blocks of the at least one selected superblock, is present in a memory chip to which the first physical block belongs, according to the plurality of internal block valid page count tables; and remapping the first physical block and the second physical block by updating one or more of the plurality of virtual block mapping tables, when the second physical block is present in the memory chip to which the first physical block belongs.

2. The control method of claim 1, wherein the checking whether a second physical block having a smaller valid page count than a first physical block, among the plurality of physical blocks of the at least one selected superblock, is present in a memory chip to which the first physical block belongs, according to the plurality of internal block valid page count tables, is performed when the valid page count of the first physical block is larger than or equal to a threshold value of the valid phage count.

3. The control method of claim 1, wherein in the remapping the first physical block and the second physical block by updating one or more of the plurality of virtual block mapping tables, when the second physical block is present in the memory chip to which the first physical block belongs, the first physical block and the second physical block are remapped by updating the virtual block mapping table of the memory chip to which the first physical block of the at least one selected superblock and the second physical block of another superblock belong.

4. The control method of claim 3, wherein in the remapping the first physical block and the second physical block by updating one or more of the plurality of virtual block mapping tables, when the second physical block is present in the memory chip to which the first physical block belongs, the virtual block mapping table of the memory chip is updated to include instruction data for mapping the first physical block of the at least one selected superblock to the second physical block which belongs to another superblock.

5. A storage device comprising:
a memory comprising a plurality of memory chips; and
a storage device controller electrically coupled to the memory and configured to control the memory to perform data access, and perform a plurality of operations, wherein the plurality of operations comprise operations of:

(a) providing a superblock valid page count table of a plurality of superblocks and a plurality of internal block valid page count tables each corresponding to a plurality of physical blocks comprised in a corresponding one of the plurality of superblocks, wherein each of the plurality of superblocks corresponds to one group of the plurality of physical blocks which belong to the respective memory chips, which are different from one another, and which do not overlap one another, each of the plurality of physical blocks corresponds to some of a plurality of pages of a corresponding memory chip among the plurality of memory chips, the superblock valid page count table comprises a total valid page count of the plurality of physical blocks corresponding to each of the plurality of superblocks, and each of the plurality of internal block valid page count tables comprises a plurality of valid page counts respectively corresponding to the plurality of physical blocks of the corresponding superblock;

(b) providing a plurality of virtual block mapping tables of the plurality of memory chips, and mapping a first superblock of the plurality of superblocks, associated with one physical block address, to a second superblock of the plurality of superblocks;

(c) deciding at least one selected superblock which are to be processed to perform a garbage collection operation, among the plurality of superblocks, according to the superblock valid page count table;

(d) reducing the total valid page count of the at least one selected superblock by remapping the at least one selected superblock according to the plurality of internal block valid page count tables and the plurality of virtual block mapping tables; and (e) performing a garbage collection operation on the remapped at least one selected superblock, wherein the operation (d) comprises the operations of:

(d1) checking whether a second physical block having a smaller valid page count than a first physical block, among the plurality of physical blocks of the at least one selected superblock, is present in a memory chip to which the first physical block belongs, according to the internal block valid page count table; and (d2) remapping the first physical block and the second physical block by updating one or more of the plurality of virtual block mapping tables, when the second physical block is present in the memory chip to which the first physical block belongs.

6. The storage device of claim 5, wherein the storage device controller performs the operation (d1) when the valid page count of the first physical block is larger than or equal to a threshold value of the valid phage count.

7. The storage device of claim 5, wherein in the operation (d2), the storage device controller remaps the first physical block and the second physical block by updating the virtual block mapping table of the memory chip to which the first physical block of the at least one selected superblock and the second physical block of another superblock belong.

8. The storage device of claim 7, wherein in the operation (d2), the storage device controller updates the virtual block mapping table of the memory chip to include instruction data for mapping the first physical block of the at least one selected superblock to the second physical block which belongs to another superblock.

9. A memory system comprising:
nonvolatile memory devices each including plural superblocks; and
a controller configured to:
select a victim superblock including a smaller number of valid pages than any among remaining superblocks,
determine whether a smaller-valid-pages block than a greater-valid-pages block, among a plurality of physical blocks of the selected victim superblock, is present in a non-volatile memory device to which the greater-valid-pages block belongs, according to a plurality of internal block valid page count tables,
exchange the greater-valid-pages block with the smaller-valid-pages block by updating one or more of a plurality of virtual block mapping tables to remap the greater-valid-pages block and the smaller-valid-pages block, in response to a determination that the smaller-valid-pages block is present in a same non-volatile memory device to which the greater-valid pages block belongs, and
control the memory device to perform a garbage collection operation on the victim superblock,
wherein the greater-valid-pages block is included in the victim superblock and the smaller-valid-pages block is included in one among the remaining superblocks, and
wherein the smaller-valid-pages block has a smaller number of valid pages than the greater-valid-pages block.

\* \* \* \* \*